United States Patent
Gyarmati et al.

(10) Patent No.: US 12,297,901 B2
(45) Date of Patent: May 13, 2025

(54) TRANSMISSION FOR A VEHICLE, AND POWER TRAIN HAVING SUCH A TRANSMISSION

(71) Applicant: ZF Friedrichshafen AG, Friedrichshafen (DE)

(72) Inventors: Tamas Gyarmati, Bermatingen (DE); Philip Dötschel, Friedrichshafen (DE); Matthias Reisch, Ravensburg (DE); Stephan Scharr, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/544,805

(22) Filed: Dec. 19, 2023

(65) Prior Publication Data

US 2024/0200649 A1 Jun. 20, 2024

(30) Foreign Application Priority Data

Dec. 19, 2022 (DE) ...................... 10 2022 213 923.2

(51) Int. Cl.
*F16H 57/04* (2010.01)
*F16H 37/04* (2006.01)
(Continued)

(52) U.S. Cl.
CPC ..... *F16H 57/0483* (2013.01); *F16H 57/0426* (2013.01); *F16H 2037/047* (2013.01);
(Continued)

(58) Field of Classification Search
CPC ............ F16H 57/0483; F16H 57/0426; F16H 37/082; F16H 2037/047; F16H 2048/423;
(Continued)

(56) References Cited

U.S. PATENT DOCUMENTS

| 5,845,732 A | * | 12/1998 | Taniguchi | ............... B60K 17/16 180/65.6 |
| 2005/0026735 A1 | * | 2/2005 | Tiesler | ...................... F16H 3/66 475/269 |

(Continued)

FOREIGN PATENT DOCUMENTS

| DE | 102013215877 B4 | 6/2016 |
| DE | 102018112880 A1 | 12/2018 |

(Continued)

OTHER PUBLICATIONS

Merged JP2018168891A and english translation; May 28, 2024 (Year: 2024).*

(Continued)

*Primary Examiner* — Roger L Pang
(74) *Attorney, Agent, or Firm* — Dority & Manning, P.A.

(57) ABSTRACT

A transmission for a power train of a vehicle includes an input shaft, two output shafts, and a differential arranged between the two output shafts. The differential includes two planetary gear sets, which include multiple gear set elements. A first output torque is at least indirectly transmittable onto the first output shaft by the first planetary gear set. A support torque of the first planetary gear set is convertible in the second planetary gear set such that a second output torque, which corresponds to the first output torque, is transmittable onto the second output shaft. A second gear set element of the first planetary gear set is connected to the first output shaft for conjoint rotation via a spline. At least one first duct for axial passage of lubricant is formed between inner toothing and the outer toothing of the spline.

18 Claims, 3 Drawing Sheets

(51) Int. Cl.
  *F16H 37/08* (2006.01)
  *F16H 48/10* (2012.01)
  *F16H 48/42* (2012.01)

(52) U.S. Cl.
  CPC ...... *F16H 37/082* (2013.01); *F16H 2048/104* (2013.01); *F16H 2048/106* (2013.01); *F16H 2048/423* (2013.01)

(58) Field of Classification Search
  CPC ......... F16H 2048/104; F16H 2048/106; B60Y 2400/804; B60K 17/046; B60K 17/165
  USPC ................ 475/150, 160, 248, 253, 330, 903
  See application file for complete search history.

(56) References Cited

U.S. PATENT DOCUMENTS

| | | | |
|---|---|---|---|
| 2020/0292057 A1* | 9/2020 | Bergdal | F16H 57/0427 |
| 2022/0205520 A1* | 6/2022 | Beck | B60K 1/00 |
| 2023/0265917 A1* | 8/2023 | Brehmer | B60K 17/16 475/150 |

FOREIGN PATENT DOCUMENTS

| | | |
|---|---|---|
| DE | 102018103295 B3 | 2/2019 |
| DE | 102019216508 A1 | 4/2021 |

OTHER PUBLICATIONS

German Search Report for Application No. 102022213923.2 dated Feb. 27, 2024.

* cited by examiner

TRANSMISSION FOR A VEHICLE, AND POWER TRAIN HAVING SUCH A TRANSMISSION

CROSS-REFERENCE TO RELATED APPLICATION

The present application is related and has right of priority to German Patent Application No. DE102022213923.2 filed on Dec. 19, 2022, which is incorporated by reference in its entirety for all purposes.

TECHNICAL FIELD

The invention relates generally to a transmission for a power train of a vehicle and to a power train having such a transmission.

BACKGROUND

DE 10 2013 215 877 B4 relates to an epicyclic gear train for branching the drive power applied at a power input to a first power output and to a second power output in conjunction with reducing the output rotational speed to a rotational speed level that is below the input rotational speed at the power input. The epicyclic gear train has a first planetary gear stage, which includes a first sun gear, a first planetary gear set, a first planet carrier and a first ring gear. The epicyclic gear train also has a second planetary gear stage, which includes a second sun gear, a second planetary gear set, a second planet carrier and a second ring gear. The epicyclic gear train also has a third planetary gear stage, which includes a third sun gear, a third planetary gear set, a third planet carrier and a third ring gear. The first sun gear acts as a power input, wherein the first planet carrier is connected to the second sun gear for conjoint rotation. The second planet carrier is fixed in position, the first ring gear is connected to the third sun gear for conjoint rotation and the third ring gear is connected to the second planet carrier for conjoint rotation. A first power output is brought about via the third planetary gear stage, wherein a second power output is brought about via the second ring gear of the second planetary gear stage.

In these types of transmissions, lubricant for lubricating the transmission components is generally supplied and distributed by at least one of the output shafts, wherein the relevant output shaft has axially extending ducts for distributing lubricant and radially extending ducts for delivering lubricant specifically to the transmission components to be lubricated. In particular, the substantially radially extending ducts or bores reduce the structural durability of the particular shaft, such that the shaft must be designed with a larger outer diameter. In addition, lubricant collecting points are necessary on transmission components, in particular on the transmission components close to the output shafts. The lubricant collecting points also reduce the structural durability of the relevant component.

BRIEF SUMMARY

Example aspects of the present invention provide a space-saving transmission for a power train of a vehicle, which is based on an improved concept for supplying lubricant.

A transmission according to example aspects of the invention for a power train of a vehicle includes an input shaft, a first output shaft, a second output shaft and a differential, which is operatively arranged between the input shaft and the two output shafts, wherein the differential has a first planetary gear set, which includes multiple gear set elements, and a second planetary gear set, which includes multiple gear set elements and is operatively connected to the first planetary gear set. A first output torque is at least indirectly transmittable onto the first output shaft by the first planetary gear set. A support torque of the first planetary gear set is convertible in the second planetary gear set such that a second output torque, which corresponds to the first output torque, is transmittable onto the second output shaft. A first gear set element in the first planetary gear set is connected to the input shaft for conjoint rotation. A second gear set element in the first planetary gear set is at least indirectly connected to the first output shaft for conjoint rotation. A third gear set element in the first planetary gear set is at least indirectly connected to a first gear set element in the second planetary gear set for conjoint rotation. A second gear set element in the second planetary gear set is connected to a stationary component for conjoint rotation. A third gear set element in the second planetary gear set is at least indirectly connected to the second output shaft for conjoint rotation.

The differential is understood to be an integral differential. In this type of transmission, the two wheel torques are not combined to form a single axle torque in a component. Instead, the drive power introduced into the input shaft is divided in the differential and applied onto the output shafts operatively connected to the planetary gear sets in accordance with the design and the connection of the planetary gear sets. As a result, the components in the integral differential can be more slender due to the respective, relatively low torques they have to accommodate. This also results in smaller components and a weight reduction. A transmission is therefore provided, which both converts and distributes the torque by the integral differential, which previously required two separate assemblies instead of a single, integral assembly. Example aspects of the invention therefore provide a combined transmission and differential, which converts as well as distributes torque onto the output shafts, wherein power distribution is also achieved.

An integral differential is understood in the framework of example aspects of the invention to be a differential that has both a first planetary gear set and a second planetary gear set operatively connected to the first planetary gear set, wherein the first planetary gear set is drivingly connected to the input shaft, to the second planetary gear set and at least indirectly to the first output shaft. The second planetary gear set is drivingly connected to the second output shaft. The input torque to the input shaft is convertible by such an integral differential and is distributable and transmittable at a defined ratio onto the two output shafts. Preferably, fifty percent (50%), i.e., one half, of the input torque is transmitted onto each of the output shafts. Therefore, the differential does not have a component that is subjected to both output torques. In other words, the two torques are never combined. Furthermore, the differential has no gears that rotate in a block, or without a rolling motion, when the output rotational speeds of the output shafts are identical. Consequently, the intermeshed components in the differential always rotate in relation to one another, independently of the output rotational speeds of the output shafts.

The integral differential is therefore in the form of a planetary transmission having two planetary gear sets and the gear set elements sun gear, ring gear and multiple planet gears guided by a planet carrier on a circular path around the sun gear. A "planetary gear set" is understood to be a unit that includes a sun gear, a ring gear and multiple planet gears guided by a planet carrier on a circular path around the sun gear, wherein the planet gears are meshed with the ring gear and the sun gear.

The input shaft is preferably designed to be at least indirectly connected to a drive shaft in a drive unit for conjoint rotation. The drive unit generates drive power that is transmitted onto the input shaft via the drive shaft. The drive shaft of the drive unit can be connected to the input shaft for conjoint rotation. Alternatively, the drive shaft and the input shaft are a coherent or one-piece component. Depending on the design of the power train, two or more input shafts can also be provided, in particular when the power train is a hybridized power train and, therefore, two or more drive units are provided.

The input shaft is preferably a hollow shaft. As a result, one of the output shafts, preferably the first output shaft, can fit axially inside the input shaft. One of the output shafts, in particular the first output shaft, preferably extends through the transmission and potentially through the drive unit in the power train. The particular output shaft therefore extends through the transmission "inline" for transmitting drive power onto the wheel that is operatively connected to the particular output shaft.

The output shafts of the transmission are designed, in particular, to be operatively connected to a wheel on the vehicle. The particular output shaft can be connected to the associated wheel directly or indirectly, i.e., via, for example, a joint and/or a wheel hub. The output shafts are preferably coaxial to each other. Due to the coaxial arrangement of the output shafts, a radially slender design of the transmission can be realized. It is also conceivable to arrange the output shafts in parallel to and offset from each other.

A "shaft" is understood to be a rotatable component in the transmission with which various components in the transmission are connected to one another for conjoint rotation. The particular shaft can connect the components to one another axially or radially or also both axially and radially. A shaft is not to be understood exclusively to be a, for example, cylindrical, rotatably mounted machine element for transmitting torques, but rather a shaft is also understood to refer to general connecting elements that connect individual components or elements to one another, in particular, connecting elements that connect multiple elements to one another for conjoint rotation.

If two components in the transmission are "connected or coupled for conjoint rotation," this means, as set forth in example aspects of the invention, that there is a permanent connection between components, such that the two components cannot rotate independently of each other. This is therefore also understood to be a permanent rotary joint. In particular, there are no shifting elements between the two components, which can be elements in the differential, and/or shafts, and/or a nonrotating component in the transmission, but instead, the two components are permanently coupled to each other. An elastically rotating connection between two components is also understood to be permanent, or such that the elements rotate conjointly.

A stationary component is understood to be a rotationally and axially fixed component in the transmission, for example, the transmission housing. The stationary component can therefore be arranged in a housing-fixed manner. The term "housing-fixed" is understood to mean that relative motion does not takes place or cannot take place between the particular housing-fixed gear set element and the stationary component of the transmission.

According to a first example aspect of the invention, the second gear set element in the first planetary gear set is connected to the first output shaft for conjoint rotation via a spline, which includes an internal toothing on the second gear set element in the first planetary gear set and an external toothing on the first output shaft, wherein at least one first duct for the axial passage of lubricant is formed between the internal toothing and the external toothing.

A spline is understood to be a form-locking shaft-hub connection, in which the first output shaft has an external toothing and the second gear set element in the first planetary gear set has an internal toothing, the external toothing and the internal toothing engaging into one another in a form-locking manner and thus forming a multiple-driver connection. The spline is preferably a serration or a serrated gear (serration spline) and, in particular, involute gearing (involute spline). Toothing having a spline profile that has straight and parallel tooth flanks is also conceivable. The teeth or the drivers and tooth gaps of the spline are preferably axially straight (i.e., not helical or the like) on the first output shaft and also on the second gear set element in the first planetary gear set.

The particular first duct on the spline can be arbitrarily designed, in principle. It is conceivable that axially continuous gaps are formed between the mutually engaging teeth, through which gaps lubricant can also flow during a transmission of torque. One tooth or multiple teeth of the internal toothing and the external toothing can be shortened, for example, on the tip. It is also conceivable, for example, that notches are formed on one or multiple tooth flank(s). Furthermore, it is conceivable that one or multiple tooth gap(s) between two teeth is/are formed more deeply than the remaining tooth gaps of the internal toothing and the external toothing.

In one example embodiment, an axial portion of the second gear set element in the first planetary gear set is arranged radially between the first output shaft and the second output shaft and is mounted by a bearing element for rotation with respect to the second output shaft, wherein at least one second duct for the axial passage of lubricant is formed on an inner circumference of the second output shaft in the area of the axial portion of the second gear set element in the first planetary gear set and in the area of the bearing element. The second duct therefore extends between the second output shaft, or a coupling shaft, which is formed as one piece with the output shaft, and the axial portion of the second gear set element in the first planetary gear set. The internal toothing of the spline is preferably formed on the axial portion of the second gear set element in the first planetary gear set. The bearing element can be a plain bearing, a needle bearing or the like. Lubricant can also be conveyed via the second duct to other bearing points, in particular to axial bearings, in the transmission.

When a shaft is mounted or fixed with respect to another shaft or a component, the shaft is mounted or fixed on the other shaft or on the component at least indirectly, i.e., either directly or via at least one further component. In other words, the shaft is not mounted or fixed spatially with respect to, but rather in relation to, i.e., with regard to the other shaft or the component.

According to a second example aspect of the invention, an axial portion of the second gear set element in the first planetary gear set is arranged radially between the first output shaft and the second output shaft and is mounted by a bearing element for rotation with respect to the second output shaft, wherein at least one second duct for the axial passage of lubricant is formed on an inner circumference of the second output shaft in the area of the axial portion of the second gear set element in the first planetary gear set and in the area of the bearing element. The second duct therefore extends between the second output shaft, or a coupling shaft, which is formed as one piece with the output shaft, and the axial portion of the second gear set element in the first planetary gear set. The internal toothing of the spline is preferably formed on the axial portion of the second gear set element in the first planetary gear set. The bearing element can be a plain bearing, a needle bearing or the like. Lubricant can also be conveyed via the second duct to other bearing points, in particular to axial bearings, in the transmission.

Preferably, the second gear set element in the first planetary gear set is connected to the first output shaft for conjoint rotation via a spline, which includes an internal toothing on the second gear set element in the first planetary gear set and an external toothing on the first output shaft, wherein at least one first duct for the axial passage of lubricant is formed between the internal toothing and the external toothing.

The particular first duct on the spline can be arbitrarily designed, in principle. It is conceivable that axially continuous gaps are formed between the mutually engaging teeth, through which gaps lubricant can also flow during a transmission of torque. One tooth or multiple teeth of the internal toothing and the external toothing can be shortened, for example, at the tip. It is also conceivable, for example, that notches are formed on one or multiple tooth flank(s). Furthermore, it is conceivable that one or multiple tooth gap(s) between two teeth is/are formed more deeply than the remaining tooth gaps of the internal toothing and the external toothing.

In one example embodiment of the transmission according to the first or the second example aspect of the invention, at least one tooth is missing on the internal toothing of the spline and/or on the external toothing of the spline in the circumferential direction in order to form the particular first duct for the axial passage of lubricant. The more teeth that are missing and the more first ducts that are provided, the greater is the amount of lubricant that can be conveyed from the one side of the spline to the other side of the spline. Lubricant can be conveyed via the first duct to bearing points, in particular to axial bearings, in the transmission.

The advantages of the transmission according to the first example aspect of the invention and according to the second example aspect of the invention are that lubricant guide ducts, in particular the lubricant guide ducts that extend radially and lead to the outer circumference of the particular shaft, within one or both of the output shafts can be dispensed with. The structural durability of the output shafts can be improved due to the omission of the lubricant guide ducts. In addition, manufacturing costs can be reduced, because the particular output shaft no longer needs to be bored. In addition, the output shafts can be made narrower. In addition, sealing points between the output shafts can be reduced or entirely eliminated.

The first planetary gear set is preferably arranged, at least in part, radially inside the second planetary gear set. The planetary gear sets of the integral differential are therefore radially nested. The gear set elements in the first and the second planetary gear sets are therefore axially arranged in a common plane. The first and the second planetary gear sets are preferably located substantially in a common wheel plane, enabling the transmission to be axially shorter and, therefore, particularly compact. The first planetary gear set and the second planetary gear set are arranged radially above each other. It is also conceivable that the first and the second planetary gear sets are not arranged in a common plane, and instead the first planetary gear set is offset in the axial direction with respect to the second planetary gear set.

In principle, the planetary gear sets in the transmission, in particular the integral differential and the epicyclic gear train, can be arbitrarily arranged with respect to one another and arbitrarily operatively connected to one another in order to implement a desired gear ratio. According to one example embodiment, the first gear set element is a sun gear in the particular planetary gear set, the second gear set element is a planet carrier in the particular planetary gear set and the third gear set element is a ring gear in the particular planetary gear set. The input shaft is therefore connected to the sun gear in the first planetary gear set for conjoint rotation, wherein the planet carrier in the first planetary gear set is connected to the first output shaft for conjoint rotation, and wherein the ring gear in the first planetary gear set is at least indirectly connected to the sun gear in the second planetary gear set for conjoint rotation. In particular, the ring gear in the first planetary gear set is connected to the sun gear in the second planetary gear set for conjoint rotation via a coupling shaft. The input shaft and the sun gear in the first planetary gear set can be formed as one piece. One further advantage of the transmission according to example aspects of the invention is that no oil collecting points are needed on the inner diameter of the first sun gear shaft in the first planetary gear set, as a result of which the diameter of the first sun gear shaft can be made smaller. This results in turn in planetary gear sets that can be made smaller, as a result of which installation space is reduced.

Furthermore, in this sense, the planet carrier in the second planetary gear set is fixed in position, for example, at a housing, wherein the ring gear in the second planetary gear set is connected to the second output shaft for conjoint rotation. The connection of the gear set elements between the planetary gear sets can be arbitrarily interchanged depending on the requirement on the ratios. Further components, for example, intermediate shafts or coupling shafts, can also be arranged between the aforementioned components, i.e., the gear set elements in the planetary gear sets.

The particular planetary gear set is preferably a negative planetary gear set or a positive planetary gear set. A negative planetary gear set corresponds to a planetary gear set with a planet carrier, on which first planet gears are rotatably mounted, and with a sun gear and a ring gear, wherein the teeth on at least one of the planet gears meshes with the teeth on the sun gear as well as with the teeth on the ring gear, whereby the ring gear and the sun gear rotate in opposite directions when the sun gear rotates while the carrier is held. A positive planetary gear set differs from the negative planetary gear set in that the positive planetary gear set has first and second or inner and outer planet gears which are rotatably mounted on the planet carrier. The teeth of the first or inner planet gears mesh with the teeth of the sun gear and with the teeth of the second or outer planet gears. In addition, the teeth of the outer planet gears mesh with the teeth of the ring gear. As a result, the ring gear and the sun gear rotate in the same direction when the planet carrier is held.

In the design of one or more of the planetary gear sets as a positive planetary gear set, the connection of the planet carrier and the ring gear is interchanged and the absolute value of the stationary transmission ratio is increased by one (1). Correspondingly, this is also possible the other way around when a negative planetary gear set is to be provided in place of a positive planetary gear set.

Alternatively, it is also conceivable to form one or multiple planetary gear set(s) as a stepped planetary gear set or stepped planetary gear sets. Each stepped planetary gear of the particular stepped planetary gear set preferably has a first gearwheel with a second gearwheel connected thereto for conjoint rotation. The first gearwheel is preferably meshed, for example, with the sun gear and the second gearwheel is therefore meshed with the ring gear, or vice versa. These two gearwheels can be connected to each other for conjoint rotation, for example, via an intermediate shaft or a hollow shaft. In the case of a hollow shaft, the hollow shaft can be rotatably mounted on a pin of the planet carrier. The two gearwheels in the particular stepped planetary gear preferably have different diameters and numbers of teeth in order to set a gear ratio. Composite planetary gear sets are also conceivable.

The term "operatively connected" is understood to be a permanent connection between two components, the permanent connection being provided for permanently transmitting drive power, in particular rotational speed and/or torque. The connection can be implemented directly or via a fixed ratio. The connection can be implemented, for example, via a fixed shaft, gear teeth, in particular on a spur gear, and/or with a belt.

The term "at least indirectly" is understood to mean that two components are (operatively) connected to each other via at least one other component, located between the two components, or that the two components are directly connected to each other. Other components can also be arranged between shafts or gear wheels, which are operatively connected to the shaft or to the gear wheel.

Further interconnected components can be arranged between the input shaft and the drive unit, which are formed, for example, as a planetary transmission, a spur gear drive, a sprocket, a belt drive, a bevel gear, a universal joint shaft, a torsional shock absorber, a multi-speed transmission or the like. Further interconnected components can also be arranged between the particular output shaft and the wheel operatively connected thereto, such as, for example, universal joint shafts, transmission gearing, spring and damping elements or the like.

The first gear set element in the first planetary gear set is preferably mounted by a first axial bearing for rotation with respect to the second gear set element in the first planetary gear set. According to one preferred example embodiment, the first sun gear in the first planetary gear set is mounted by the first axial bearing for rotation with respect to the first planet carrier in the first planetary gear set. The first axial bearing is preferably supplied with lubricant via the particular first duct.

Preferably, the second gear set element in the first planetary gear set is mounted by a second axial bearing for rotation with respect to the second output shaft. According to one preferred example embodiment, the first planet carrier in the first planetary gear set is mounted by the second axial bearing for rotation with respect to the second output shaft. The second axial bearing is preferably supplied with lubricant via the particular second duct.

A power train according to example aspects of the invention for a vehicle includes, according to a third example aspect of the invention, a transmission as described above. The transmission is operatively connected to a drive unit. The drive unit is preferably an electric machine, wherein the input shaft of the transmission is a rotor of the electric machine or is connected or coupled to the rotor or to a rotor shaft for conjoint rotation. The rotor is mounted for rotation with respect to a housing-fixed stator in the electric machine. The electric machine is preferably connected to an accumulator, which supplies the electric machine with electrical energy. The electric machine is also preferably controllable by way of an open-loop or closed-loop system by a power electronics system. The drive unit can also be an internal combustion engine, wherein, in this case, the input shaft is, for example, a crankshaft, or is connected or coupled to the crankshaft for conjoint rotation.

The drive unit is preferably coaxial to the integral differential. An additional ratio change from the input shaft onto the rotor shaft or the rotor or the crankshaft of the drive unit is therefore not necessary. One of the output shafts axially extends through the drive unit in this case.

The power train of the type described above is usable in a vehicle. The vehicle is preferably a motor vehicle, in particular an automobile (for example, a passenger car weighing less than three and a half (3.5) tons), a bus, or a truck (busses and trucks can weigh more than three and a half (3.5) tons). In particular, the vehicle is an electric vehicle or hybrid vehicle. The vehicle has at least two axles, wherein one of the axles is formed by an axle that is drivable by the power train. The power train according to example aspects of the invention is operatively arranged on this drivable axle and the power train transmits drive power from the drive unit onto the wheels on this axle via the transmission according to example aspects of the invention. It is also conceivable that there is a separate power train of this type for each axle. The power train is preferably front-wheel drive, in which the input shaft and the output shafts are substantially transverse to the longitudinal axis of the vehicle. Alternatively, the power train can be at an angle to the longitudinal and lateral axes of the vehicle, wherein the output shafts are connected to the wheels on the particular axle with joints that are transverse to the longitudinal axis of the vehicle.

The above definitions and explanations of the technological effects, advantages and advantageous example embodiments of the transmission according to example aspects of the invention, according to the first example aspect of the invention, also apply analogously to the transmission according to example aspects of the invention, according to the second example aspect of the invention, and to the power train according to example aspects of the invention, according to the third example aspect of the invention.

BRIEF DESCRIPTION OF THE DRAWINGS

One example embodiment of the invention is explained in greater detail in the following with reference to the schematic drawings, in which identical or similar elements are provided with the same reference characters. Therein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
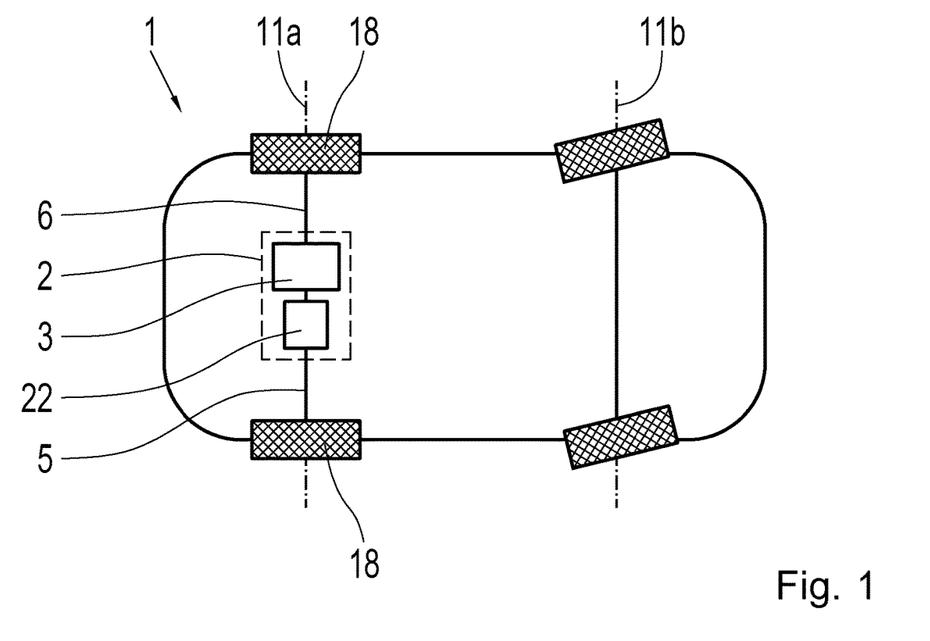
FIG. 1 shows a highly schematic top view of a vehicle with a power train according to example aspects of the invention and a transmission according to example aspects of the invention in one preferred example embodiment.

FIG. 1 shows a vehicle 1 with two axles 11a, 11b, a power train 2 according to example aspects of the invention being drivingly arranged at the first axle 11a. The vehicle 1 is an electric vehicle in this case, the vehicle 1 being driven purely electrically. The first axle 11a can be either a front axle or a rear axle of the vehicle 1 and forms a driven axle of the vehicle 1. The power train 2 includes a drive unit 22, which is in the form of an electric machine, and a transmission 3 operatively connected thereto. The design and the arrangement of the transmission 3 are explained in greater detail in the following figures. The design of the drive unit 22 is not shown here.

The drive unit 22 or the electric machine also has an accumulator, which supplies the drive unit 22 with electrical energy, and a power electronics system for the open-loop control and closed-loop control of the drive unit 22. A rotor (not shown here), which is arranged so as to be rotatable with respect to the stator and is connected, as a drive shaft, to an input shaft 4 (shown in FIG. 2) in the transmission 3 for conjoint rotation, is set into a rotational movement in relation to the stator by energizing a stator (not shown here). The drive power of the drive unit 22 is directed via the input shaft 4 into the transmission 3 and there is converted by an integral differential 7 and at least indirectly divided onto a first output shaft 5 and a second output shaft 6. The drive unit 22 is coaxial to the integral differential 7.

A wheel 18 is at least indirectly connected at each of the ends of the output shafts 5, 6, which are coaxial to each other in the present case, in order to drive the vehicle 1. According to FIG. 2, a joint 28 is arranged between the wheel 18 and the output shafts 5, 6, respectively, in order to compensate for possible inclinations of the output shafts 5, 6.

Figure 2:
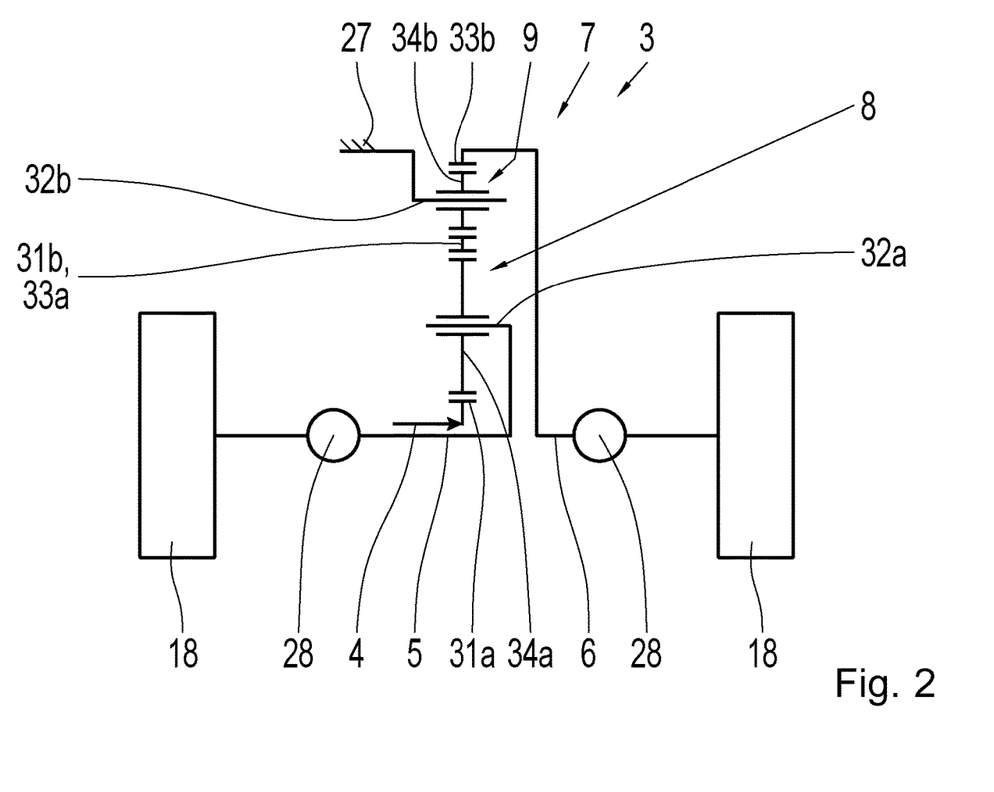
FIG. 2 shows a highly simplified view of the transmission according to example aspects of the invention shown in FIG. 1.

The transmission 3 shown in greater detail in FIG. 2 is a differential gear. The output shafts 5, 6 are coaxial to each other and extend in opposite directions to the wheels 18, wherein the first output shaft 5 extends axially through the transmission 3, in particular through the integral differential 7, and through the drive unit 22. The drive unit 22 is not longer shown in FIG. 2 for the sake of simplicity.

The integral differential 7 has a first planetary gear set 8, which includes multiple gear set elements, and a second planetary gear set 9, which also includes multiple gear set elements and which is operatively connected to the first planetary gear set 8. A first output torque is transmittable onto the first output shaft 5 by the first planetary gear set 8. A support torque of the first planetary gear set 8 is convertible in the second planetary gear set 9 such that a second output torque, which corresponds to the first output torque, is transmittable onto the second output shaft 6.

In the present case, a first sun gear 31a as the first gear set element, a first planet carrier 32a as the second gear set element, and a first ring gear 33a as the third gear set element are arranged at the first planetary gear set 8, wherein multiple first planet gears 34a, which are meshed with the first sun gear 31a and the first ring gear 33a, are rotatably arranged on the first planet carrier 32a. The first output shaft 5 extends axially through the first sun gear 31a in the first planetary gear set 8. Therefore, the first sun gear 31a is formed as a ring gear and the input shaft 4 connected thereto is formed as a hollow shaft. The first sun gear 31a is fixedly seated on the input shaft 4 or is connected thereto for conjoint rotation. The first sun gear 31a and the input shaft 4 are connected to each other as one piece in this case.

Furthermore, a second sun gear 31b as the first gear set element, a second planet carrier 32b as the second gear set element, and a second ring gear 33b as the third gear set element are arranged on the second planetary gear set 9, wherein multiple second planet gears 34b, which are meshed with the second sun gear 31b and the second ring gear 33b, are rotatably arranged on the second planet carrier 32b.

The first planetary gear set 8 and the second planetary gear set 9 are each in the form of a negative planetary gear set and are radially nested and, therefore, arranged in a common plane, which extends perpendicularly to the axle 11a. Axial installation space is reduced as a result. The first planetary gear set 8 is arranged radially inside the second planetary gear set 9 in the present case.

The first planet carrier 32a in the first planetary gear set 8 is connected to the first output shaft 5 for conjoint rotation via a spline 24. The first ring gear 33a in the first planetary gear set 8 is connected to the second sun gear 31b in the second planetary gear set 9 as one piece and for conjoint rotation. The second planet carrier 32b in the second planetary gear set 9 is supported in a housing-fixed manner against a stationary component 27 which is the transmission housing in the present case. The second ring gear 33b in the second planetary gear set 9 is also connected to the second output shaft 6 for conjoint rotation.

It is explicitly pointed out that the assignment of the gear set elements to the elements in the particular planetary gear set 8, 9 can be arbitrarily interchanged. The particular connection of the sun gear, the planet carrier and the ring gear, as the gear set elements, is implemented including the sign as required for the ratios. Instead of a negative planetary gear set, the particular planetary gear set 8, 9 can also always be in the form of a positive planetary gear set by interchanging the connection of the planet carrier and the ring gear and increasing the absolute value of the stationary gear ratio by one (1). Correspondingly, the other way around is also possible.

It is also conceivable to arrange an additional transmission gearing (not shown here), which is in the form, for example, of a spur gear stage or a planetary transmission having one or multiple planetary gear set(s), between the drive unit 22 and the transmission 3 in order to increase an overall gear ratio of the drive and/or to implement an axial offset of the output shafts 5, 6, for example, when it is not possible to axially extend one of the output shafts 5, 6 through the drive unit 22.

Figure 3:
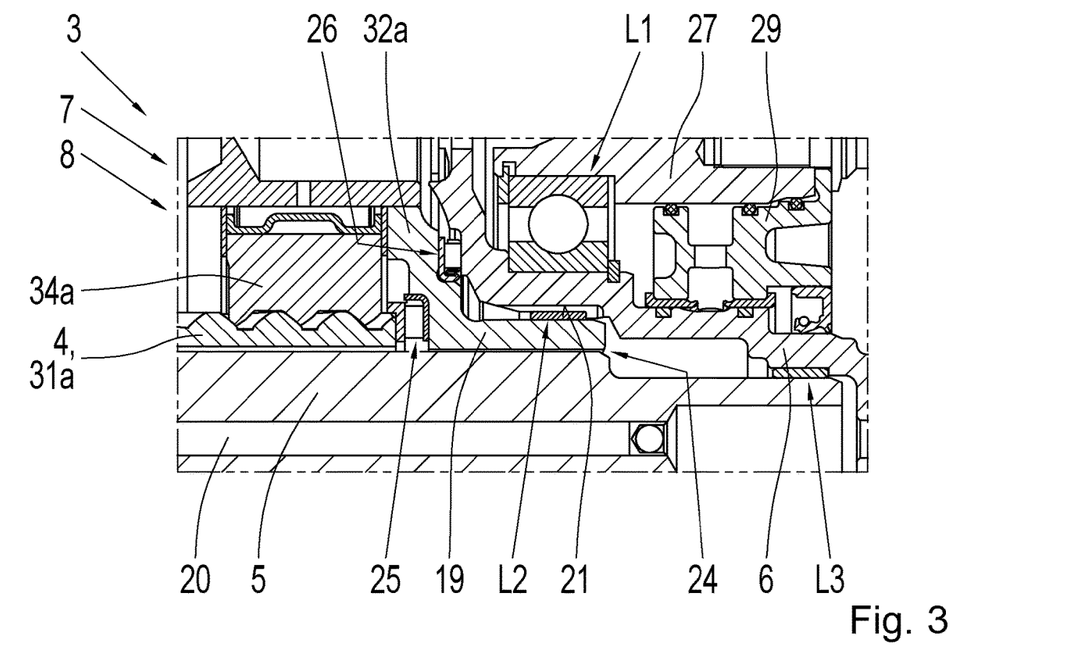
FIG. 3 shows a schematic partial sectional view of the transmission according to example aspects of the invention shown in FIG. 1.
Figure 4:
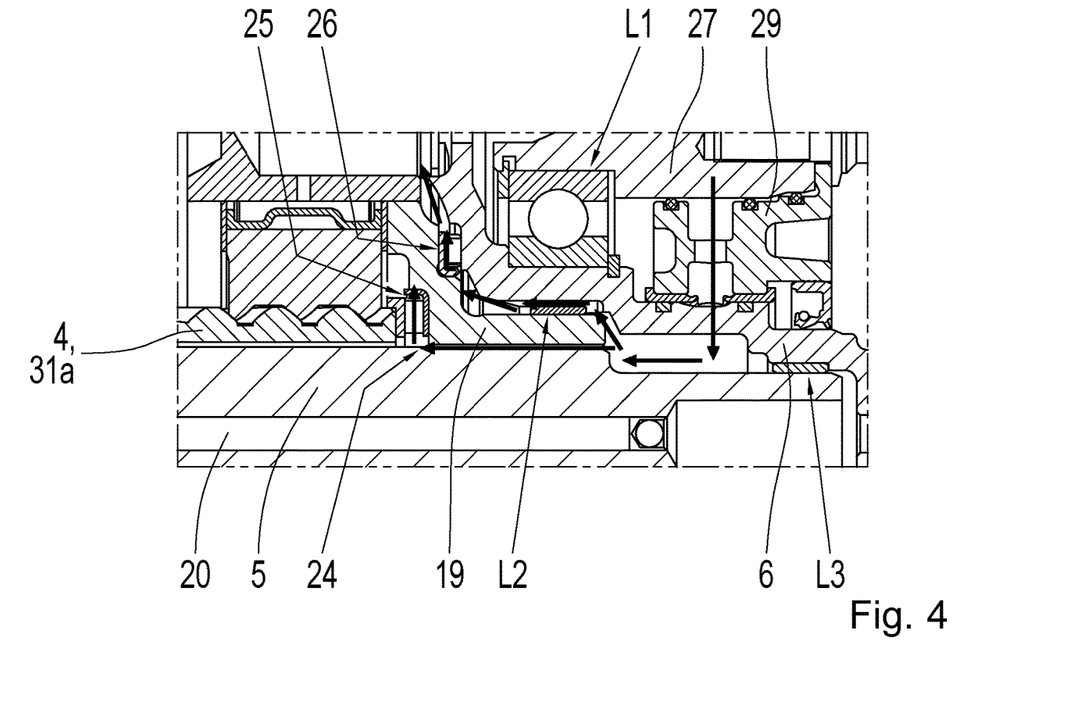
FIG. 4 shows a schematic partial sectional view of the transmission according to example aspects of the invention shown in FIG. 3, including an oil guide device.

According to FIG. 3 and FIG. 4, the first sun gear 31a in the first planetary gear set 8 is mounted for rotation and axially supported with respect to the first planet carrier 32a in the first planetary gear set 8 by a first axial bearing 25. In addition, the first planet carrier 32a in the first planetary gear set 8 is mounted for rotation and axially supported with respect to the second output shaft 6 via a second axial bearing 26.

The second output shaft 6 is mounted for rotation with respect to the stationary component 27 via a first bearing element L1 which is in the form of a grooved ball bearing. The second output shaft 6 is mounted for rotation with respect to the first planet carrier 32a in the first planetary gear set 8 via a second bearing element L2 which is in the form of a plain bearing. The second output shaft 6 is mounted for rotation with respect to the first output shaft 5 via a third bearing element L3 which is in the form of a plain bearing, wherein the second output shaft 6 partially accommodates the first output shaft 5 and entirely accommodates the third bearing element L3. The gap between the second output shaft 6 and the stationary component 27, in which the first bearing element L1 is located, is sealed and closed by a cover element 29.

Figure 5:
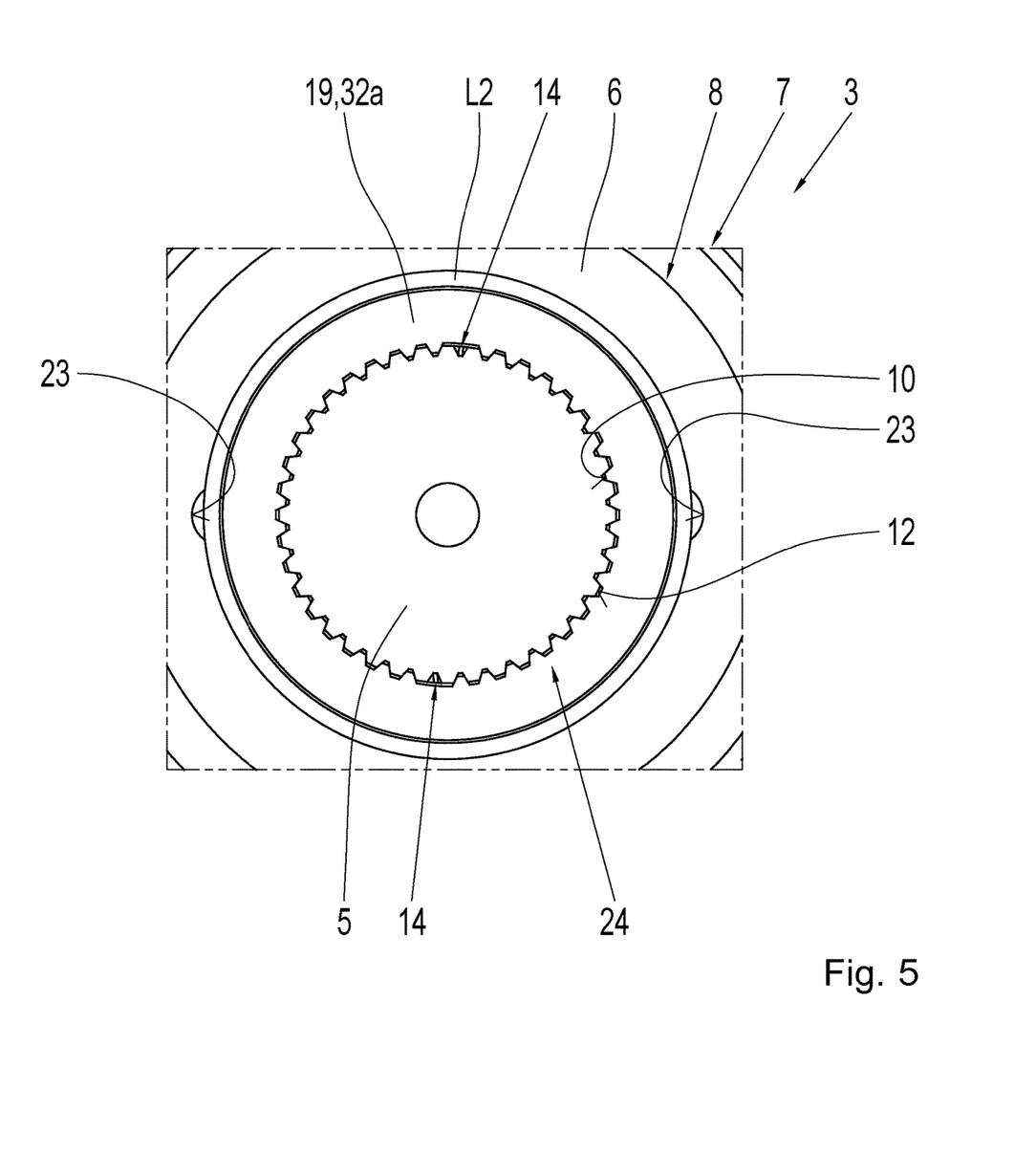
FIG. 5 shows a schematic cross-section of the transmission according to example aspects of the invention shown in FIG. 1 through FIG. 4.

According to FIG. 3 through FIG. 5, the spline 24 has an internal toothing 10 on an axial portion 19 of the first planet carrier 26a in the first planetary gear set 8 and an external toothing 12 on the first output shaft 5, wherein at least one first duct 14 for the axial passage of lubricant is formed between the internal toothing 10 and the external toothing 12. In the present example, the first duct 14 is formed due to the fact that two teeth are missing at the external toothing 12 of the spline 24. This is clearly shown in FIG. 5. In other words, one tooth is missing between two teeth of the internal toothing 10 at each of two opposite points of the spline 24 in the circumferential direction, these gaps forming a first duct 14 in each case for the axial passage of lubricant to the first axial bearing 25. Alternatively, a particular tooth tip of a tooth can be shortened and/or a tooth gap between two teeth can be more deeply formed in order to form the particular first duct 14.

The axial portion 19 of the first planet carrier 26a in the first planetary gear set 8 is arranged radially between the first output shaft 5 and the second output shaft 6 and is mounted via the second bearing element L2 so as to rotate with respect to the second output shaft 6. As is also shown in FIG. 5, two axially extending second ducts 23 are arranged on opposite sides in the area of the axial portion 19 and of the bearing element L2 on an inner circumference 21 of the second output shaft 6 in order to enable lubricant to be conveyed to the second axial bearing 26. The second ducts 23 are formed as indentations having semi-circular cross-sections.

Lubricant is fed or delivered into the system via the cover element, which has appropriate seal (not described here in greater detail) for sealing. From the cover element, the lubricant is distributed along the arrows shown in FIG. 4 and conveyed via the ducts 14, 23 to the axial bearings 25, 26. Such an approach does not require any bores in the first output shaft 5 and/or the second output shaft 6 in order to distribute the lubricant. As a result, the particular output shaft 5, 6 can be made with a smaller outer diameter, because there are no bores, in particular no transversal bores, which reduce the structural durability. Therefore, weak points in the output shafts 5, 6 are reduced. This approach requires no lubricant collecting points on the inner diameter of the first sun gear shaft in the first planetary gear set, as a result of which the sun gear shaft can have a smaller diameter, as a result of which the differential 7 can be made more compact. In addition, no additional seals are required between the two output shafts 5, 6. The first output shaft 5 has a longitudinal bore 20. However, this is used exclusively to reduce weight and not for conveying lubricant. In other words, this longitudinal bore 20 can also be dispensed with.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 power train
3 transmission
4 input shaft
5 first output shaft
6 second output shaft
7 differential
8 first planetary gear set
9 second planetary gear set
10 internal toothing
11a first axle
11b second axle
12 external toothing
14 first duct
18 wheel
19 axial portion of the second gear set element in the first planetary gear set
20 longitudinal bore
21 inner circumference of the second output shaft
22 drive unit
23 second duct
24 spline
25 first axial bearing
26 second axial bearing
27 stationary component
28 joint
29 cover element
31a sun gear in the first planetary gear set
31b sun gear in the second planetary gear set
32a planet carrier in the first planetary gear set
32b planet carrier in the second planetary gear set
33a ring gear in the first planetary gear set
33b ring gear in the second planetary gear set
34a planet gear in the first planetary gear set
34b planet gear in the second planetary gear set
L1 first bearing element
L2 second bearing element
L3 third bearing element

The invention claimed is:

1. A transmission (3) for a power train (2) of a vehicle (1), comprising:
   an input shaft (4);
   a first output shaft (5);
   a second output shaft (6); and
   a differential (7) operatively arranged between the input shaft (4) and the first and second output shafts (5, 6), the differential (7) comprising a first planetary gear set (8) and a second planetary gear set (9), the first planetary gear set (8) comprising a first gear set element, a second gear set element, and a third gear set element, a first output torque being at least indirectly transmittable onto the first output shaft (5) by the first planetary gear set (8), the second planetary gear set (9) comprising a first gear set element, a second gear set element, and a third gear set element, the second planetary gear set (9) operatively connected to the first planetary gear set (8), a support torque of the first planetary gear set (8) being convertible in the second planetary gear set (9) such that a second output torque, which corresponds to the first output torque, is transmittable onto the second output shaft (6), wherein the first gear set element of the first planetary gear set (8) is connected to the input shaft (4) for conjoint rotation, the second gear set element of the first planetary gear set (8) is connected to the first output shaft (5) for conjoint rotation via a spline (24) that includes an inner toothing (10) on the second gear set element of the first planetary gear set (8) and an outer toothing (12) on the first output shaft (5), a third gear set element of the first planetary gear set (8) is at least indirectly connected to the first gear set element of the second planetary gear set (9) for conjoint rotation, the second gear set element of the second planetary gear set (9) is connected to a stationary component (27) for conjoint rotation, the third gear set element of the second planetary gear set (9) is at least indirectly connected to the second output shaft (6) for conjoint rotation, wherein at least one first duct (14) for axial passage of lubricant is formed between the inner toothing (10) and the outer toothing (12)

wherein an axial portion (19) of the second gear set element of the first planetary gear set (8) is arranged radially between the first output shaft (5) and the second output shaft (6), and wherein at least one second duct (23) for the axial passage of lubricant is formed on an inner circumference (21) of the second output shaft (6) proximate the axial portion (19) of the second gear set element of the first planetary gear set (8).

2. The transmission (3) of claim 1, wherein:
the axial portion (19) of the second gear set element of the first planetary gear set (8) is mounted by a bearing element (L2) for rotation relative to the second output shaft (6); and
the at least one second duct (23) for axial passage of lubricant is formed proximate the axial portion (19) and proximate the bearing element (L2).

3. The transmission (3) of claim 1, wherein at least one tooth is missing on one or both of the internal toothing (10) of the spline (24) and the external toothing (12) of the spline (24) in a circumferential direction in order to form the respective first duct (14) for the axial passage of lubricant.

4. The transmission (3) of claim 1, wherein the first planetary gear set (8) is at least partially arranged radially inside the second planetary gear set (9).

5. The transmission (3) of claim 1, wherein each of the first and second planetary gear sets (8, 9) is either a negative planetary gear set or a positive planetary gear set.

6. The transmission (3) of claim 1, wherein the first gear set element of each of the first and second planetary gear sets (8, 9) is a respective sun gear, the second gear set element of each of the first and second planetary gear sets (8, 9) is a respective planet carrier, and the third gear set element of each of the first and second planetary gear sets (8, 9) is a respective ring gear.

7. The transmission (3) of claim 1, wherein the first gear set element of the first planetary gear set (8) is mounted by a first axial bearing (25) for rotation relative to the second gear set element of the first planetary gear set (8).

8. The transmission (3) of claim 1, wherein the second gear set element of the first planetary gear set (8) is mounted by a second axial bearing (26) for rotation relative to the second output shaft (6).

9. A power train (2) for a vehicle (1), comprising the transmission (3) of claim 1.

10. A transmission (3) for a power train (2) of a vehicle (1), comprising:

an input shaft (4);
a first output shaft (5);
a second output shaft (6); and
a differential (7) operatively arranged between the input shaft (4) and the first and second output shafts (5, 6), the differential (7) comprising a first planetary gear set (8) and a second planetary gear set (9), the first planetary gear set (8) comprising a first gear set element, a second gear set element, and a third gear set element, a first output torque being at least indirectly transmittable onto the first output shaft (5) by the first planetary gear set (8), the second planetary gear set (9) comprising a first gear set element, a second gear set element, and a third gear set element, the second planetary gear set (9) being operatively connected to the first planetary gear set (8), a support torque of the first planetary gear set (8) being convertible in the second planetary gear set (9) such that a second output torque corresponding to the first output torque is transmittable onto the second output shaft (6), wherein the first gear set element of the first planetary gear set (8) is connected to the input shaft (4) for conjoint rotation, the second gear set element of the first planetary gear set (8) is at least indirectly connected to the first output shaft (5) for conjoint rotation, the third gear set element of the first planetary gear set (8) is at least indirectly connected to the first gear set element of the second planetary gear set (9) for conjoint rotation, the second gear set element of the second planetary gear set (9) is connected to a stationary component (27) for conjoint rotation, the third gear set element of the second planetary gear set (9) is at least indirectly connected to the second output shaft (6) for conjoint rotation, wherein an axial portion (19) of the second gear set element of the first planetary gear set (8) is arranged radially between the first output shaft (5) and the second output shaft (6) and is mounted by a bearing element (L2) for rotation relative to the second output shaft (6), wherein at least one second duct (23) for axial passage of lubricant is formed on an inner circumference (21) of the second output shaft (6) proximate the axial portion (19) of the second gear set element of the first planetary gear set (8) and proximate the bearing element (L2).

11. The transmission (3) of claim 10, wherein:
the second gear set element of the first planetary gear set (8) is connected to the first output shaft (5) for conjoint rotation via a spline (24) that includes an internal toothing (10) on the second gear set element of the first planetary gear set (8) and an external toothing (12) on the first output shaft (5); and
at least one first duct (14) for axial passage of lubricant is formed between the internal toothing (10) and the external toothing (12).

12. The transmission (3) of claim 10, wherein at least one tooth is missing on one or both of the internal toothing (10) of the spline (24) and the external toothing (12) of the spline (24) in a circumferential direction in order to form the respective first duct (14) for the axial passage of lubricant.

13. The transmission (3) of claim 10, wherein the first planetary gear set (8) is at least partially arranged radially inside the second planetary gear set (9).

14. The transmission (3) of claim 10, wherein each of the first and second planetary gear sets (8, 9) is either a negative planetary gear set or a positive planetary gear set.

15. The transmission (3) of claim 10, wherein the first gear set element of each of the first and second planetary gear sets (8, 9) is a respective sun gear, the second gear set element of each of the first and second planetary gear sets (8, 9) is a respective planet carrier, and the third gear set element of each of the first and second planetary gear sets (8, 9) is a respective ring gear.

16. The transmission (3) of claim 10, wherein the first gear set element of the first planetary gear set (8) is mounted by a first axial bearing (25) for rotation relative to the second gear set element of the first planetary gear set (8).

17. The transmission (3) of claim 10, wherein the second gear set element of the first planetary gear set (8) is mounted by a second axial bearing (26) for rotation relative to the second output shaft (6).

18. A power train (2) for a vehicle (1), comprising the transmission (3) of claim 10.

* * * * *